US007952978B2

(12) United States Patent
Anzai et al.

(10) Patent No.: US 7,952,978 B2
(45) Date of Patent: May 31, 2011

(54) OPTICAL CONTROL DEVICE, OPTICAL INFORMATION RECORDING/REPRODUCING DEVICE, OPTICAL INFORMATION RECORDING MEDIUM AND OPTICAL HEAD CONTROL METHOD

(75) Inventors: Joji Anzai, Osaka (JP); Hideki Aikoh, Osaka (JP); Eishin Mori, Kyoto (JP); Takayuki Nagata, Osaka (JP)

(73) Assignee: Panasonic Corporation, Osaka (JP)

( * ) Notice: Subject to any disclaimer, the term of this patent is extended or adjusted under 35 U.S.C. 154(b) by 520 days.

(21) Appl. No.: 12/089,737

(22) PCT Filed: Oct. 19, 2006

(86) PCT No.: PCT/JP2006/320868
§ 371 (c)(1),
(2), (4) Date: Apr. 10, 2008

(87) PCT Pub. No.: WO2007/046478
PCT Pub. Date: Apr. 26, 2007

(65) Prior Publication Data
US 2009/0262630 A1 Oct. 22, 2009

(30) Foreign Application Priority Data
Oct. 20, 2005 (JP) ................................. 2005-305487

(51) Int. Cl.
*G11B 7/00* (2006.01)
(52) U.S. Cl. ......... 369/112.23; 369/112.03; 369/112.04; 369/112.07; 369/112.12; 369/110.03; 369/109.01; 369/109.02; 369/109.03; 369/275.1; 369/120

(58) Field of Classification Search .................. None
See application file for complete search history.

(56) References Cited

U.S. PATENT DOCUMENTS

| 6,418,108 | B1 * | 7/2002 | Ueda et al. ............... 369/112.23 |
| 7,770,060 | B2 * | 8/2010 | Blacquiere et al. .......... 714/6.13 |
| 2004/0139459 | A1 | 7/2004 | Mishima et al. |
| 2005/0088953 | A1 * | 4/2005 | Kurokawa et al. ............ 369/116 |
| 2005/0270953 | A1 * | 12/2005 | Okada et al. ................. 369/100 |

FOREIGN PATENT DOCUMENTS

| JP | 11-259906 A | 9/1999 |
| JP | 2000-293947 A | 10/2000 |

(Continued)

OTHER PUBLICATIONS

International Search Report for PCT/JP2006/320868, dated Jan. 23, 2007.

*Primary Examiner* — Joseph Haley
*Assistant Examiner* — Ifedayo Iluyomade
(74) *Attorney, Agent, or Firm* — RatnerPrestia

(57) ABSTRACT

An optical controller includes a light source for emitting light, an object lens for condensing light emitted from the light source, a light detection unit for receiving light reflected on an optical information recording medium and outputting a signal corresponding to the amount of the light, and a laser control unit for controlling the amount of the light emitted from the light source to the information recording surface on which information is to be recorded or reproduced, based on the recording state of an information recording surface disposed closer to the object lens than an information recording surface on which the information is to be recorded or reproduced.

11 Claims, 7 Drawing Sheets

FOREIGN PATENT DOCUMENTS

| | | |
|---|---|---|
| JP | 2001-148133 A | 5/2001 |
| JP | 2002-279634 A | 9/2002 |
| JP | 2004-171740 A | 6/2004 |
| JP | 2004-213720 A | 7/2004 |
| JP | 2004-220744 A | 8/2004 |
| JP | 2005-135459 A | 5/2005 |
| JP | 2006-179153 A | 7/2006 |
| WO | WO 2004/019326 A1 | 3/2004 |
| WO | WO 2005/031718 A1 | 4/2005 |

* cited by examiner

OUTER
CIRCUMFERENCE

INNER
CIRCUMFERENCE

OPTICAL CONTROL DEVICE, OPTICAL INFORMATION RECORDING/REPRODUCING DEVICE, OPTICAL INFORMATION RECORDING MEDIUM AND OPTICAL HEAD CONTROL METHOD

This application is a U.S. national phase application of PCT International Patent Application No. PCT/JP2006/320868 filed Oct. 19, 2006, claiming the benefit of priority of Japanese Patent Application No. 2005-305487 filed Oct. 20, 2005, all of which are incorporated by reference herein in their entirety.

TECHNICAL FIELD

The present invention relates to an optical controller, a control method, and so on in an optical information recording/reproducing apparatus for recording or reproducing information on an information storage medium such as an optical disk and an optical card.

BACKGROUND ART

At present, optical disks such as CDs and DVDs are available and optical disks such as BDs and HD-DVDs for achieving higher density recording by means of a blue laser are available. Optical disks having two-layer recording surfaces have been put into practical use as DVDs and BDs. Further, in recent years, recordable and reproducible optical disks with multilayer recording surfaces of four layers and eight layers are proposed to further increase capacities (for example, patent document 1).

[Patent document 1]: (Japanese Patent Laid-Open No. 2004-213720)

DISCLOSURE OF THE INVENTION

Incidentally, in a typical recordable optical disk, the transmittance changes with a recording state on an information recording surface, that is, depending upon whether information has been recorded or not. For example, in the case of a WORM optical disk having a phase-change film, the transmittance of light passing through an information recording surface changes by about 3% to 7% depending upon whether or not information has been recorded on the information recording surface.

FIG. 12 is a schematic view of an optical disk having a multilayer information recording surface. In FIG. 12, an optical disk 400 has information recording surfaces L0 to L3 of four layers.

In this case, when information is to be recorded or reproduced on the innermost information recording surface L0 of the optical disk 400, a transmittance on the information recording surface L0 of the optical disk 400 changes by about 10% to 20% depending upon whether or not information has been recorded on the information recording surfaces L1 to L3 disposed at the front of the information recording surface L0. When the laser emission power is constant in recording and reproducing operations, an amount of light reaching the information recording surface L0 is reduced to about 80% to 90% in response to a change of the recording states of the three information recording surfaces disposed at the front of the information recording surface L0.

A conventional optical disk such as a DVD and a BD (Blu-ray Disc) has information recording surfaces of two layers. Since the number of layers is small, the transmittance of a laser beam on an information recording surface disposed inside relative to a light source is not changed by the recording state of an information recording surface disposed at the front, or a change in the transmission of the information recording surface is acceptable. However, in the multilayer optical disk of FIG. 12, the recording states of the other information recording surfaces disposed at the front of the information recording surface on which information is to be recorded or reproduced are not negligible when information is recorded or reproduced on the target information recording surface. In other words, when a laser beam is used through the information recording surface on which a transmittance has decreased due to recording of information, the quality of a mark deteriorates during recording or an S/N ratio decreases during reproduction, so that information cannot be stably recorded or reproduced.

The present invention is designed in view of this problem. An object of the present invention is to provide an optical controller, a method of controlling an optical head, an optical information recording/reproducing apparatus, and so on whereby when information is recorded or reproduced on an optical information recording medium having a multilayer structure, the information can be reliably recorded or reproduced regardless of the recording state of an information recording surface disposed at the front of an information recording surface on which the information is to be recorded or reproduced.

MEANS TO SOLVE THE PROBLEMS

The $1^{st}$ aspect of the present invention is an optical controller, comprising:

a light source for emitting light;

an object lens for condensing light emitted from the light source onto a predetermined information recording surface of an optical information recording medium having a plurality of information recording surfaces;

a light detection unit for receiving the light reflected on the optical information recording medium and outputting a signal corresponding to an amount of the light; and a control unit for controlling an amount of the light emitted from the light source to the information recording surface on which information is to be recorded or reproduced, based on a recording state of the information recording surface disposed closer to the object lens than the information recording surface on which the information is to be recorded or reproduced.

The $2^{nd}$ aspect of the present invention is the optical controller according to the $1^{st}$ aspect of the present invention, wherein the optical information recording medium has a management information area for managing the recording states of the plurality of information recording surfaces as management information, and the control unit obtains the management information based on the signal obtained from the light detection unit and performs control using the management information.

The $3^{rd}$ aspect of the present invention is the optical controller according to the $2^{nd}$ aspect of the present invention, wherein the management information indicates presence or absence of recorded information on all or a part of the plurality of information recording surfaces; and the control unit, when information is recorded on the information recording surfaces closer to the object lens than the information recording surface on which information is to be recorded or reproduced, performs control to increase the amount of light according to the number of information recording surfaces.

The 4th aspect of the present invention is the optical controller according to the 1st aspect of the present invention, wherein the light detection unit comprises:

a first light receiving element for receiving the light reflected on the information recording surface on which information is to be recorded or reproduced; and a second light receiving element for receiving the light reflected on the other information recording surfaces, and the control unit performs the control using the signal based on light received by the second light receiving element.

The 5th aspect of the present invention is the optical controller according to the 4th aspect of the present invention, wherein the second light receiving element is made up of (h−1 (h: the number of the plurality of information recording surfaces)) unit light receiving elements, the unit light receiving elements are disposed on positions where a plurality of light receiving areas are formed by light reflected from the other information recording surfaces and where no boundaries of light receiving areas are straddled, and the control unit performs the control using the signal based on light received by the unit light receiving elements.

The 6th aspect of the present invention is the optical controller according to the 5th aspect of the present invention, further comprising a cylindrical lens provided on an optical axis of the light detection unit, the cylindrical lens forming, as a plurality of light spots formed by light reflected from the information recording surfaces other than the information recording surface on which information is to be recorded or reproduced, an oval first light spot formed by light reflected from the information recording surface disposed closer to the object lens than the information recording surface on which information is to be recorded or reproduced and an oval second light spot formed by light reflected from the information recording surface farther from the object lens than the information recording surface on which information is to be recorded or reproduced, the second light spot intersecting the first light spot, wherein in the second light receiving element, each of the light receiving elements is disposed on a part other than an overlap of the first light spot formed by light reflected from the information recording surface disposed closer to the object lens than the information recording surface on which information is to be recorded or reproduced and the second light spot formed by light reflected from the information recording surface farther from the object lens than the information recording surface on which information is to be recorded or reproduced, the light receiving element being provided on a part where the first light spot is formed.

The 7th aspect of the present invention is the optical controller according to the 1st aspect of the present invention, wherein the information recording medium has four information recording surfaces.

The 8th aspect of the present invention is the optical controller according to the 1st aspect of the present invention, wherein the optical information recording medium is a WORM recording medium.

The 9th aspect of the present invention is the optical controller according to the 1st aspect of the present invention, wherein the optical information recording medium is a rewritable recording medium.

The 10th aspect of the present invention is the optical controller according to the 1st aspect of the present invention, further comprising an aberration correcting unit provided on an optical path between the light source and the object lens to correct an aberration caused by a thickness of a protective film of the optical information recording medium.

The 11th aspect of the present invention is an optical information recording/reproducing apparatus, comprising:

an optical head for emitting light to an optical information recording medium and receiving light reflected from the optical information recording medium;

an optical head control unit for controlling an operation of the optical head;

a rotation driving unit for rotating the optical information recording medium; and an information recording/reproducing unit for transmitting and receiving, to and from the optical head, information to be recorded or reproduced on the optical information recording medium, wherein the optical head has the light source, the object lens, and the light detection unit of the optical controller according to claim 1, and the optical head control unit has the control unit of the optical controller.

The 12th aspect of the present invention is an optical information recording medium, comprising:

a plurality of information recording surfaces on which information can be recorded or reproduced by the optical information recording/reproducing apparatus according to the 11th aspect of the present invention, and a management information area for managing, as the management information, the recording states of the plurality of information recording surfaces.

The 13th aspect of the present invention is the optical information recording medium according to the 12th aspect of the present invention, wherein the optical information recording medium is a WORM recording medium.

The 14th aspect of the present invention is the optical information recording medium according to the 12th aspect of the present invention, wherein the optical information recording medium is a rewritable recording medium.

The 15th aspect of the present invention is a method of controlling an optical head including a light source for emitting light, an object lens for condensing light emitted from the light source onto a predetermined information recording surface of an optical information recording medium having a plurality of information recording surfaces, and a light detection unit for receiving the light reflected on the optical information recording medium and outputting a signal corresponding to an amount of the light, the method comprising the step of controlling an amount of the light emitted from the light source to the information recording surface on which information is to be recorded or reproduced, based on a recording state of the information recording surface disposed closer to the object lens than the information recording surface on which the information is to be recorded or reproduced.

The 16th aspect of the present invention is a computer-readable medium, having computer-executable instructions for causing a computer to act as the control unit for controlling an amount of the light emitted from the light source to the information recording surface on which information is to be recorded or reproduced, based on a recording state of the information recording surface disposed closer to the object lens than the information recording surface on which the information is to be recorded or reproduced in the optical controller according to the 1st aspect of the present invention.

The 17th aspect of the present invention is a program storage device readable by machine tangibly embodying the program according to the 16th aspect of the present invention.

ADVANTAGE OF THE INVENTION

According to the present invention, during recording or reproduction on an optical information recording medium having a multilayer structure, information can be reliably recorded or reproduced regardless of a recording state of an information recording surface disposed at the front of an information recording surface on which the information is to be recorded or reproduced.

Figure 1:
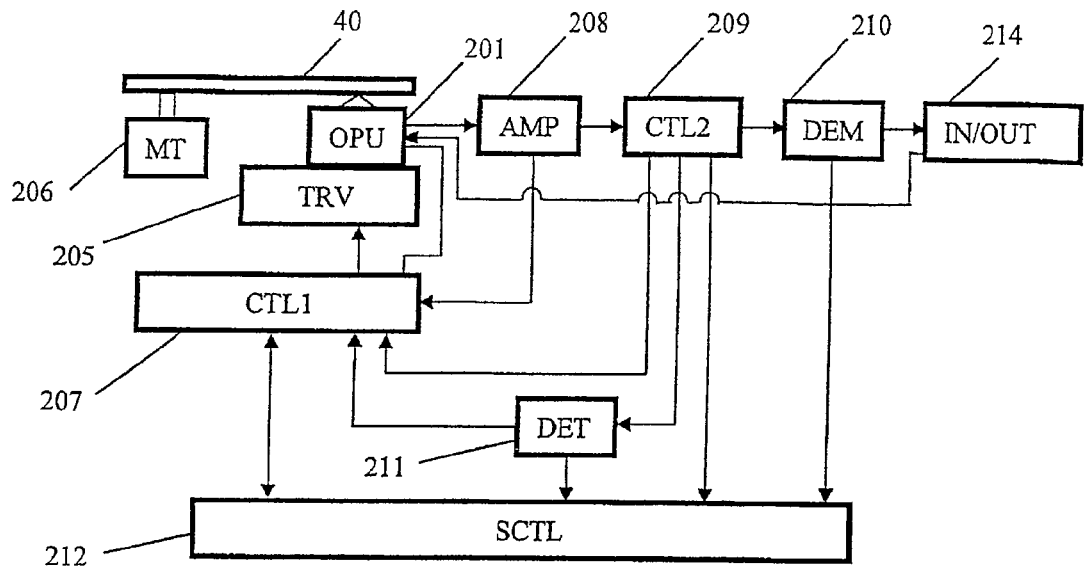
FIG. 1 is a view showing the configuration of an optical information apparatus according to First Embodiment of the present invention.

| Description of Symbols | |
|---|---|
| 1 | light source(laser) |
| 32 | photodetector |
| 33 | laser control unit |
| 40 | optical information recording medium |
| 52 | beam splitter |
| 53 | collimating lens |
| 54 | wave plate |
| 56 | object lens |
| 57 | cylindrical lens |
| 59 | converging lens |
| 60 | diffraction grating |
| 91 | actuator |
| 93 | spherical aberration correcting instrument |
| 201 | optical pickup head unit |

BEST MODE FOR CARRYING OUT THE INVENTION

The following will describe embodiments of the present invention with reference to the accompanying drawings. In these drawings, the same reference numerals represent the same constituent elements or the same effects and operations.

First Embodiment

FIG. 1 shows the configuration of an optical information apparatus according to the present embodiment. The following will describe the configuration and basic operations of each part.

In the optical information apparatus of FIG. 1, an optical pickup head unit 201 (or referred to as an optical pickup) emits a laser beam having a wavelength of 405 nm to an optical information recording medium 40 and reproduces information for a signal recorded on the optical information recording medium 40. When the optical information recording medium is a recordable disk, the optical pickup head unit 201 records information on an information recording surface.

A transfer controller 205 moves the optical pickup head unit 201 along the radial direction of the optical information recording medium 40 in order to record or reproduce information on a given position on the optical information recording medium 40. A motor 206 for driving the optical information recording medium 40 rotates the optical information recording medium 40. A controller 207 controls the optical pickup head unit 201, the transfer controller 205, and the motor 206. An amplifier 208 amplifies a signal read by the optical pickup head unit 201.

A controller 209 is fed with an output signal from the amplifier 208. Based on this signal, the controller 209 generates a servo signal such as an FE (focus error) signal and a TE (tracking error) signal which are necessary for the optical pickup head unit 201 to read the signal of the optical information recording medium 40, and the controller 209 outputs the servo signal to the controller 207.

The signal inputted to the controller 209 is an analog signal. The controller 209 digitizes (binarizes) the analog signal. A demodulator 210 analyzes the signal having been read from the optical information recording medium 40 and digitized, and reconstructs the original data including an image and music. The reconstructed signal is outputted from an input/output interface 214.

On the other hand, when information is recorded on the optical information recording medium 40, a modulated signal is inputted from the input/output interface 214 beforehand and is directly transmitted to the controller 209. The controller 209 digitizes the modulated signal which is an analog signal, and inputs the signal to the optical pickup head unit 201.

Further, the amplifier 208 operates also during the recording of information. The amplifier 208 generates the servo signal and outputs the signal to the controller 207.

A detector 211 detects an address signal and so on based on a signal outputted from the controller 209 and outputs the detected signal to a system controller 212. The system controller 212 identifies the optical information recording medium 40 based on physical format information and optical information recording medium manufacturing information (optical information recording medium management information) which are read from the optical information recording medium 40, decodes recording/reproduction conditions and so on, and controls the overall optical information apparatus.

When information is recorded or reproduced on the optical information recording medium 40, the controller 207 controls the driving of the transfer controller 205 according to an instruction from the system controller 212. As a result, in FIG. 1, the transfer controller 205 moves the optical pickup head unit 201 to a desired position on an information recording surface formed on the optical information recording medium 40 (will be described later), and the optical pickup head unit 201 records or reproduces information on the information recording surface of the optical information recording medium 40.

Figure 2:
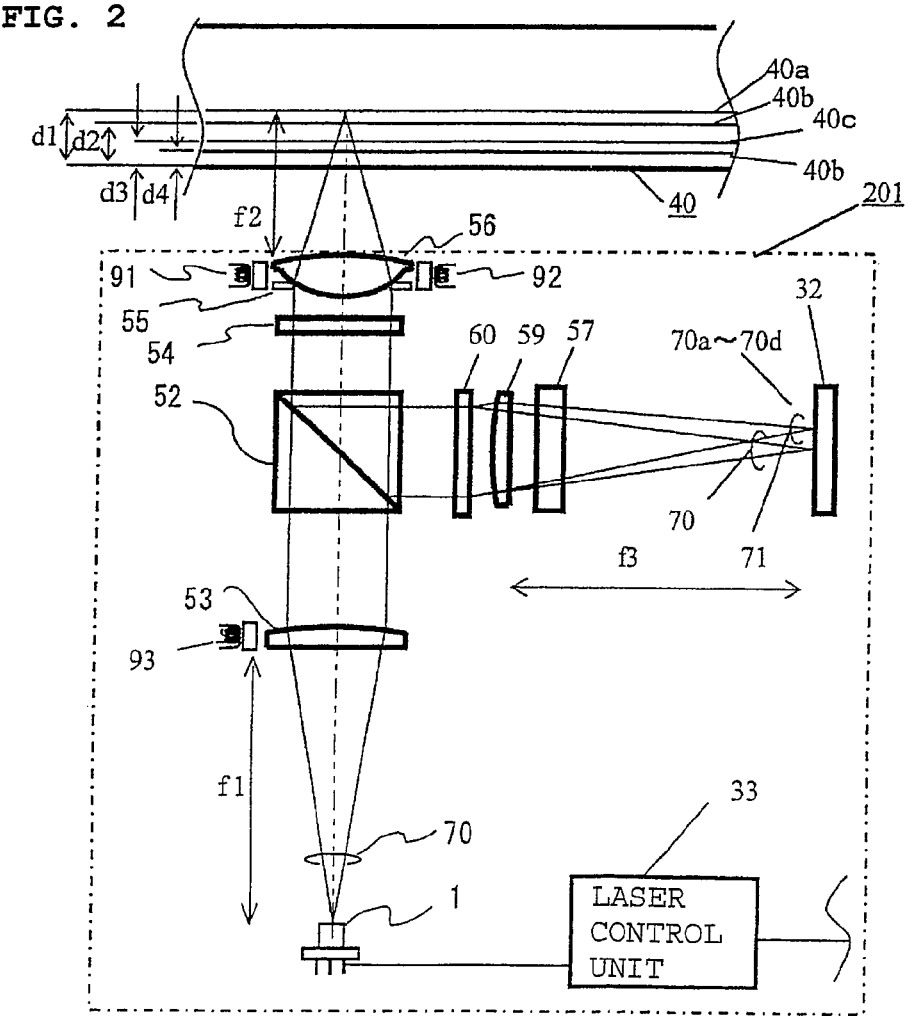
FIG. 2 is a schematic diagram showing the configuration of an optical pickup device in the optical information apparatus according to First Embodiment.

FIG. 2 is a view showing an example of the configuration of the optical pickup head unit 201 according to the present embodiment. The following will describe the configuration and basic operations of each part.

A light source 1 emits a diverging pencil of rays 70 of linear polarization having a wavelength λ of 405 nm. The diverging pencil of rays 70 emitted from the light source 1 is collimated to a parallel light beam through a collimating lens 53 having a focal length f1 of 18 mm. After that, the diverging pencil of rays 70 passes through a polarization beam splitter 52 and a ¼ wave plate 54 and is subjected to circular polarization transformation. Thereafter, the diverging pencil of rays 70 is transformed to a convergent beam through an object lens 56 having a focal length f2 of 2 mm, passes through a transparent substrate formed on the optical information recording medium 40, and is caused to converge on an information recording surface 40a.

The opening of the object lens 56 is limited by an aperture 55 and a numerical aperture NA is 0.85. In the optical information recording medium 40, information recording surfaces 40a, 40b, 40c and 40d of four layers are formed. A thickness d1 from a surface of the optical information recording medium 40 to the information recording surface 40a is 0.1 mm, a thickness d2 from the surface of the optical information recording medium 40 to the information recording surface 40b is 86 μm, a thickness d3 from the surface of the optical information recording medium 40 to the information recording surface 40c is 68 μm, a thickness d4 from the surface of the optical information recording medium 40 to the information recording surface 40d is 58 μm, and a refractive index n is 1.57.

Further, a spherical aberration correcting instrument 93 is provided which corrects a spherical aberration generated by a difference among the substrate thicknesses d1 to d4 of the information recording surfaces 40a to 40d. The spherical aberration correcting instrument 93 is configured to move the collimating lens 53 in the optical axis direction by using a stepping motor and the like.

For example, when information is reproduced on the information recording surface 40a, the reflected pencil of rays 70 passes through the object lens 56 and the ¼ wave plate 54 and is transformed into linear polarization changed from the first half of the passage by 90 degrees, and then the pencil of rays 70 is reflected in the polarization beam splitter 52. The pencil of rays 70 reflected in the polarization beam splitter 52 is split through a diffraction grating 60 into the pencil of rays 70 of a zeroth-order diffracted light beam and first-order diffracted light beams 70a to 70d, and the pencil of rays 70 and the diffracted light beams 70a to 70d are incident on a photodetector 32 through a converging lens 59 having a focal length f of 30 mm and a cylindrical lens 57. The pencil of rays 70 incident on the photodetector 32 is provided with astigmatism when passing through the cylindrical lens 57. A laser control unit 133 is an instrument which controls the magnitude of the output of the light source 1 based on a control input from the controller 207. The detail of the laser control unit 133 will be described later.

Figure 3:
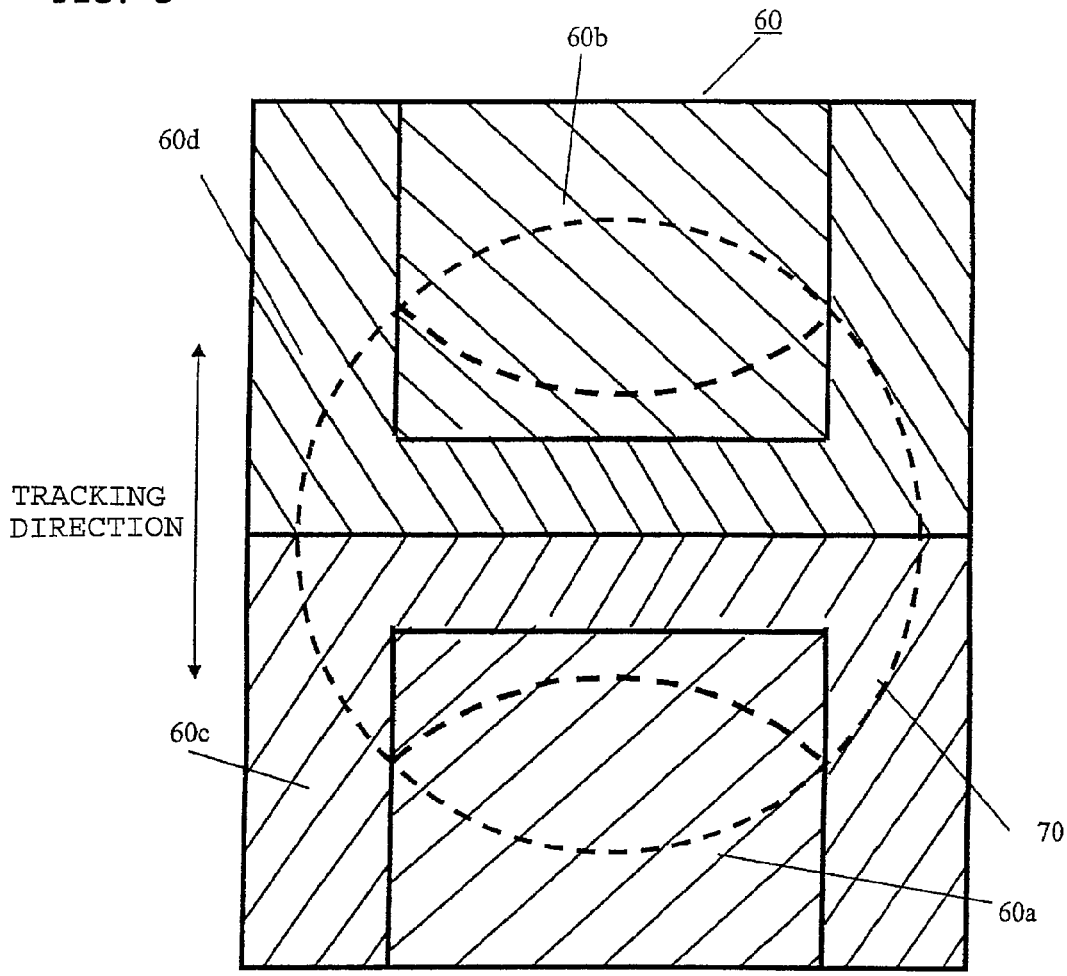
FIG. 3 is a view showing the configuration of a diffraction grating making up the optical information apparatus according to First Embodiment of the present invention.
Figure 4:
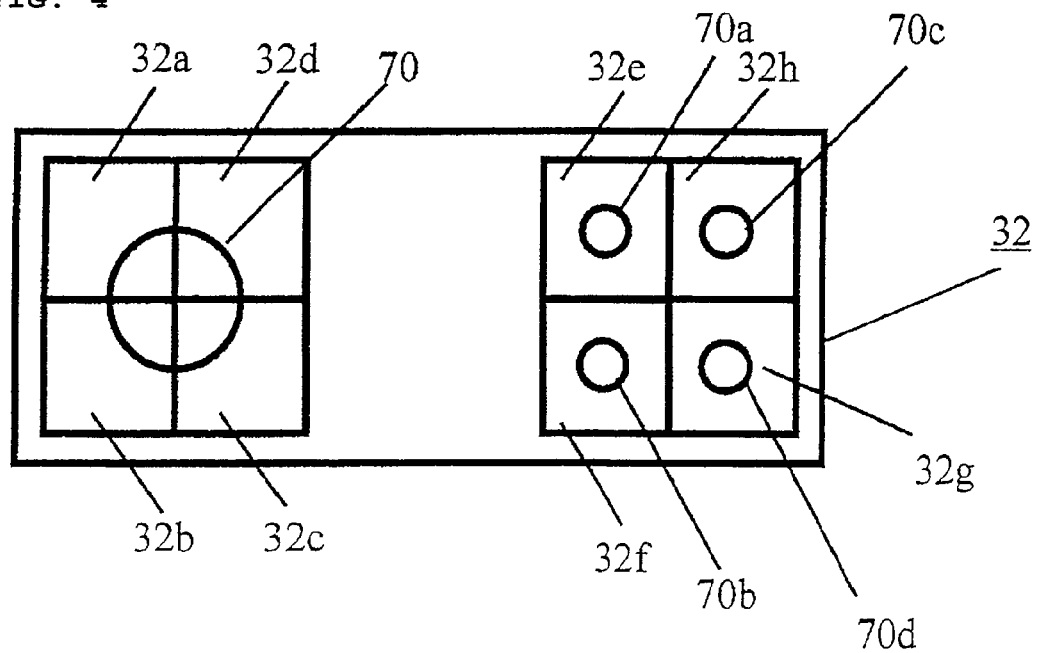
FIG. 4 is a view showing the configuration of a photodetector making up the optical information apparatus according to First Embodiment.

FIG. 3 shows the configuration of the diffraction grating 60. FIG. 4 schematically shows the relationship among the photodetector 32, the pencil of rays 70 received by the photodetector 32, and the first-order diffracted light beams 70a to 70d generated by the diffraction grating 60. Referring to FIGS. 3 and 4, the following will describe the configuration and basic operations of each part.

The diffraction grating 60 has a simple grooved shape in cross section or a blazed shape like a step or a cone. Further, the diffraction grating 60 has four areas 60a to 60d in total and the areas 60a to 60d have different grooved shapes in cross section or different blazed shapes. Thus diffracted light beams passing through the areas are emitted in different directions.

Further, the photodetector 32 has a first detection part which includes light receiving parts 32a to 32d divided into four to receive the pencil of rays 70 and second detection parts 32e to 32h which receive first-order diffracted light beams 70a to 70d, respectively.

In FIGS. 4 and 2, the first-order diffracted light beam diffracted in the area 60a is denoted as 70a, the first-order diffracted light beam diffracted in the area 60b is denoted as 70b, the first-order diffracted light beam diffracted in the area 60c is denoted as 70c, and the first-order diffracted light beam diffracted in the area 60d is denoted as 70d.

Of these areas, the areas 60a and 60b include a number of tracking components which are first-order diffracted light beams diffracted on the tracks of the information recording surface 40a, and the areas 60c and 60d are divided and configured to include few tracking components. In the diffraction grating 60, the diameter of the pencil of rays 70 entering the diffraction grating 60 after being reflected by the polarization beam splitter 52 is generally set at about 2 mm to 4 mm. The FE signal is obtained by astigmatism using signals outputted from the light receiving parts 32a to 32d of the first detection part of the photodetector 32, that is, the FE signal is obtained by $(32a+32c)-(32b+32d)$ which is an operation of the signal for each of the light receiving parts. Moreover, the TE signal is similarly obtained by $(32e-32f)-K(32h-32g)$ of the second detection part where K represents a real number.

After amplification and phase compensation to a desired level, these FE and TE signals are supplied to actuators 91 and 92 for moving the object lens 56, and then focusing and tracking control are performed.

In the above configuration, the light source 1 corresponds to the light source of the present invention and the object lens 56 corresponds to the object lens of the present invention. Further, the photodetector 32 corresponds to the light detection unit of the present invention, and the laser control unit 133, the controller 207, and the system controller 212 correspond to the control unit of the present invention.

The following will describe the optical information apparatus configured thus according to First Embodiment of the present invention. An embodiment of a method of controlling an optical head according to the present invention will be described based on this explanation.

As described in Background Art, in the case of a typical recordable information recording medium, a transmittance on an information recording surface changes depending upon whether or not information is recorded on the information recording surface. For example, in the case of a WORM information recording medium made up of a phase-change film, a transmittance changes by about 3% to 7% depending upon whether or not information is recorded on the information recording surface.

In the example shown in FIG. 2, when information is recorded or reproduced on the information recording surface 40a while the output of a laser beam emitted from the light source 1 is constant, an amount of light reaching the information recording surface 40a through the information recording surfaces 40b to 40d on which information is recorded is reduced to 80% to 90% relative to the information recording surfaces 40b to 40d on which information is not recorded.

Thus in the present embodiment, the recording states of the information recording surfaces 40b to 40d except for the information recording surface 40a on which information is currently recorded or reproduced is decided, that is, it is decided whether information has been recorded or not on the information recording surfaces 40b to 40d. A laser power from the light source 1 is switched based on the decision result to prevent a reduction in the amount of light reaching the information recording surface 40a and used for recording or reproduction.

Figure 5:
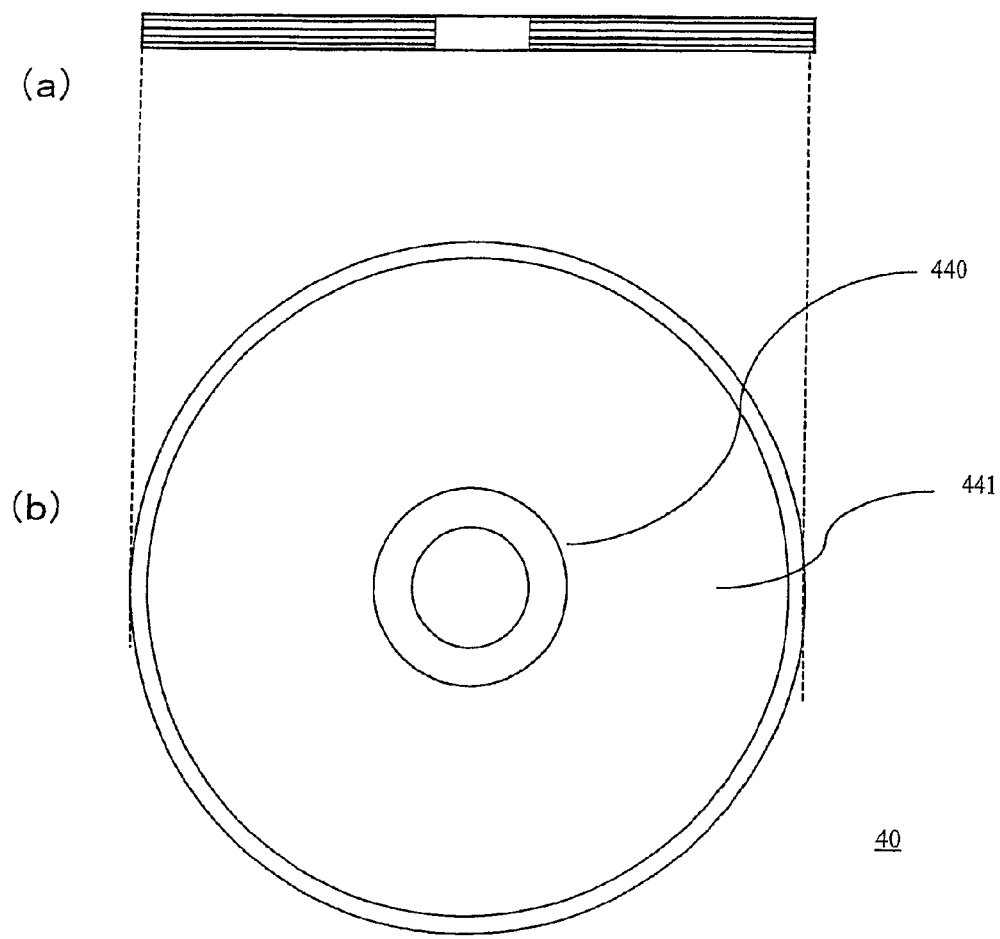
FIG. 5(a) is a view showing the configuration of an optical information recording medium according to First Embodiment of the present invention.
FIG. 5(b) is a view showing the configuration of the optical information recording medium according to First Embodiment of the present invention.

The detailed explanation will be given below. FIG. 5 is a schematic diagram of the configuration of the optical information recording medium 40.

In the optical information recording medium 40 in which the four information recording surfaces 40a to 40d are stacked, a disk management area 440 is provided on the innermost side of the information recording surface 40d which is the closest to the object lens 56, and the other area is allocated as a real information storage area 441 for recording information to be recorded or reproduced. The information recording surfaces 40b to 40d do not have the disk management area 440 and are entirely used as real information storage areas.

The disk management area 440 is provided to manage data on the information recording surfaces 40a to 40d as files and manage permission/prohibition of overwriting and the like for each of the files or each of the information recording surfaces by means of a logical address, a flag, and so on. When the optical information recording medium 40 is mounted in the optical information apparatus, information in the disk management area 440 is first read by the system controller 212, so that the optical information apparatus can record or reproduce information on the optical information recording medium 40.

In the present embodiment, the disk management area 440 stores management information indicating whether or not information is recorded on the information recording surfaces 40a to 40d.

In the management information, whether or not information is recorded on the information recording surfaces 40a to 40d is represented by 1 bit of data for each of the surfaces.

The optical information recording medium 40 shown in FIGS. 5(a) and 5(b) corresponds to the optical information recording medium of the present invention, and the disk management area 440 corresponds to the management information area of the present invention.

Figure 6:
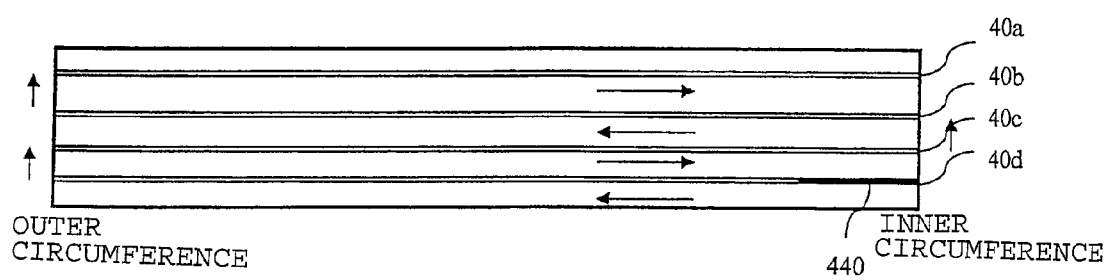
FIG. 6 is an explanatory drawing showing the operations of the optical information apparatus according to First Embodiment of the present invention.

FIG. 6 shows an example of the generation of the management information. When information is recorded on the optical information recording medium 40 from the innermost side to the outermost side of the information recording surface 40a, the outermost side to the innermost side of the information recording surface 40b, the innermost side to the outermost side of the information recording surface 40c, and the outermost side to the innermost side of the information recording surface 40d in this order, the system controller 212 performs control to rewrite the management information on the information recording surfaces from (unrecorded) to (recorded) at the completion of recording from the innermost side to the outermost side of each of the information recording surfaces.

The recording state of the information recording surface changes at the completion of recording on the surface and the order of recording information is determined. Thus at the completion of recording on each of the surfaces, the management information is rewritten each time.

In the optical information recording medium 40, the transmittance of laser decreases on the information recording surface on which information is to be recorded. This is because information has been recorded on the information recording surfaces closer to the object lens 56 than the target information recording surface. In other words, when information is recorded on the information recording surface 40c, the transmittance is reduced by one layer because information has been recorded on the information recording surface 40d. When information is recorded on the information recording surface 40b, the transmittance is reduced by two layers because information has been recorded on the information recording surfaces 40d and 40c. When information is recorded on the information recording surface 40a, the transmittance is reduced by three layers because information has been recorded on the information recording surfaces 40d, 40c and 40b.

In this configuration, every time the optical information recording medium 40 is mounted in the optical information apparatus, the system controller 212 reads the management information from the disk management area 440 to control the controller 207 and the laser control unit 133, so that the emission power of the light source 1 is controlled.

To be specific, the control is performed as follows: in the system controller 212, the emission power of the light source 1 is set at level 1 when the information recording surface 40d is in a recording state (recorded), the emission power of the light source 1 is set at level 2 when the information recording surfaces 40c and 40d are in the recording state, and the emission power of the light source 1 is set at level 3 when the information recording surfaces 40b to 40d are in the recording state. When neither of the information recording surfaces 40a to 40d is not in a recording state, that is, the information recording surfaces are in the initial state, the emission power of the light source 1 is kept at the reference level beforehand. Further, the levels 1 to 3 are the amplification factors of the emission power of the light source 1 relative to the reference level, and the relationship of level 1<level 2<level 3 is established. When information is recorded on the information recording surface 40a at level 3, the emission power is amplified to about 110% to 125% of the emission power of the recording on the information recording surface 40d.

The system controller 212 decides which of the information recording surfaces is in a recording state based on the management information read from the disk management area 440, and controls the emission power of the light source 1 at one of the levels 1 to 3 based on the level corresponding to the information recording surface.

Thus it is possible to emit a laser beam having almost the same emission power as the reference level to all the information recording surfaces, thereby reliably recording information.

Also when information is reproduced from the information recording surfaces, the information can be reliably reproduced by performing a similar control.

The level may be set in any one of the system controller 212, the controller 207, and the laser control unit 133.

In the above explanation, information is recorded or reproduced starting from the information recording surface 40b to the information recording surface 40d in the optical information recording medium 40. Actually, the order of recording or reproducing information on an optical information recording medium is not uniquely determined and is freely set according physical and logical formats and so on of the optical information recording medium (e.g., UDF in DVDs).

Therefore, the recording of information may be started from any one of the information recording surfaces 40a to 40d and the information may be shifted on the information recording surfaces in any order. For example, the recording may be shifted from the information recording surface 40b to the information recording surface 40d and then shifted to the information recording surface 40a.

Moreover, information may not be recorded on one of the information recording surfaces 40a to 40d.

Further, as to the recording direction in the information recording surfaces, the starting point and the end point may be set at any one of the innermost side and the outermost side.

Moreover, the layout of the disk management area 440 and the real information storage area 441 is not limited to the example of FIG. 5 and the areas may be set on any locations where information can be recorded on the optical information recording medium 40.

The present embodiment can also respond to an optical information recording medium configured according to such a given format. In other words, in the system controller 212, the emission power of the light source 1 is set at level 1 when one of the information recording surfaces 40a to 40d is in a recording state (recorded), the emission power of the light source 1 is set at level 2 when two of the information recording surfaces 40a to 40d are in the recording state, and the emission power of the light source 1 is set at level 3 when three of the information recording surfaces 40a to 40d are in the recording state. The relationship of the levels is the same as that of the foregoing example.

The system controller 212 decides the recording states of the information recording surfaces disposed closer to the object lens 56 than the information recording surface on which information is currently recorded or reproduced, with reference to the management information read from the optical information recording medium 40, and the system controller 212 controls the light source 1 based on the level corresponding to the decision result.

With this setting, it is possible to emit a laser beam having almost the same emission power as the reference level to all the information recording surfaces by deciding only the recording states of the information recording surfaces without depending upon physical and logical formats of the optical information recording medium, thereby reliably recording information.

Second Embodiment

In First Embodiment, the recording states of the information recording surfaces of the optical information recording medium are the recording states of the overall information recording surfaces. The present embodiment is characterized in that the recording state of each information recording surface is locally decided by using the physical addresses and logical addresses of an optical information recording medium, and the emission power of a light source 1 is controlled based on the decision result.

An optical information apparatus will now be described below. The optical information apparatus of the present embodiment has the same configuration as First Embodiment and thus will be described with reference to FIG. 1.

In First Embodiment, in the disk management area 440 of the optical information recording medium 40, information recorded on each information recording surface is managed in a predetermined unit such as a file. In some file formats of the optical information recording medium, information is recorded or reproduced by designating each file. In this case, the recording state may be partially changed on the same information recording surface of the optical information recording medium 40.

Figure 7:
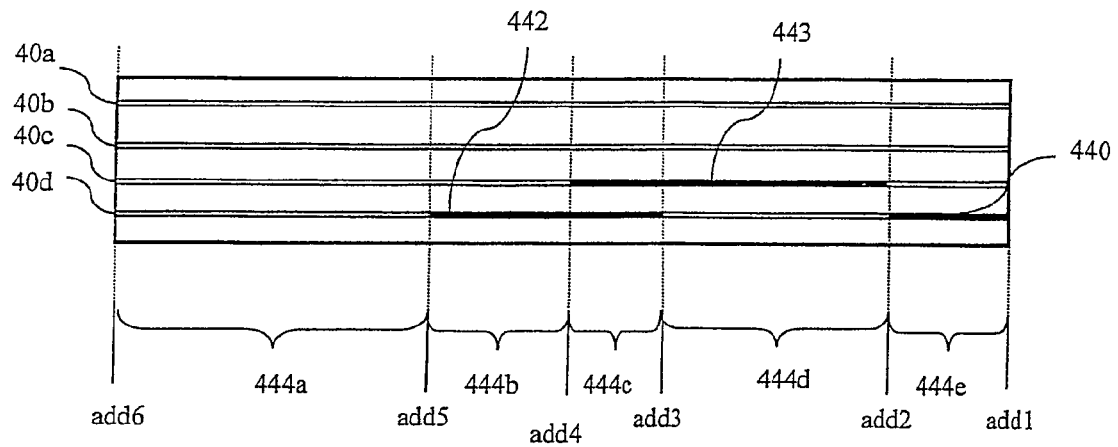
FIG. 7 is an explanatory drawing showing the operations of an optical information apparatus according to Second Embodiment of the present invention.

As shown in FIG. 7, a file 442 is recorded on an information recording surface 40d and a file 443 is recorded on an information recording surface 40c. These parts have different recording states and transmittances from the other parts of the information recording surfaces 40d and 40c.

In the present embodiment, management information can be set for each file to respond to the optical information recording medium configured thus. To be specific, the range of physical addresses corresponding to the range of logical addresses making up a recorded file is read from an optical information recording medium 40, and the management information for managing whether or not information has been recorded is provided in a range where the physical addresses are allocated. This method makes it possible to obtain the management information about the recording state of an area corresponding to the number of files generated on the optical information recording medium 40.

The following is the operations of the optical information apparatus in the state of FIG. 7 according to the present embodiment.

When information is recorded or reproduced on information recording surfaces 40a and 40b on which information has not been recorded, the transmittances of the information recording surfaces 40d and 40c are locally changeable because the files 442 and 443 are recorded on the information recording surfaces 40d and 40c disposed closer to an object lens 56 than the information recording surfaces 40a and 40b. In other words, as shown in FIG. 7, the transmittance of the information recording medium 40 with regard to the information recording surface 40a or 40b is distributed in three different patterns of an area 444a having a transmittance of 100%, areas 444b, 444d and 444e having a transmittance reduced by one surface, and an area 444c which is generated by the overlapping files 442 and 443 and has a transmittance reduced by two surfaces.

When information is recorded on one of the information recording surfaces 40a and 40b in this state, a system controller 212 decides the superimposition of the areas 444a to 444e on the physical addresses of the information recording surface on which the information is to be recorded, with reference to the physical addresses of each management information.

For example, in the case of recording on the information recording surface 40b, physical addresses add1 and add2 on the information recording surface 40b are superimposed on the area 444e, physical addresses add2 and add3 are superimposed on the area 444d, physical addresses add3 and add4 are superimposed on the area 444c, physical addresses add4 and add5 are superimposed on the area 444b, and physical addresses add5 and add6 are superimposed on the area 444e.

Further, the system controller 212 relates the physical addresses obtained thus to logical addresses for recording information, so that a point where the emission power of a light source 1 should be changed during the recording of information is determined.

With this setting, when information is recorded on the information recording surface 40b, the emission power of the light source 1 is changed on the same surface. When information is recorded from the innermost side to the outermost side, level 1 is set between add1 and add3, level 2 is set between add3 and add4, level 1 is set between add4 and add5, and the same level as the reference level is set between add5 and add6.

This adjustment makes it possible to emit a laser beam having almost the same emission power as the reference level to all the recording areas on the same information recording surface, thereby reliably recording information.

When information is recorded on the information recording surface 40b, the recording state of the information recording surface 40b is changed. Thus, the recording on the information recording surface 40a is affected by the overall or local change of the recording state of the information recording surface 40b in addition to the files 442 and 443 of the information recording surfaces 40c and 40d. Also in this case, physical addresses superimposed on the recording areas are similarly detected and the emission power is controlled based on logical addresses corresponding to the physical addresses.

In the above explanation, the level is changed step by step on the boundaries of the areas. A margin may be provided to continuously change an output on the boundary.

Third Embodiment

In First and Second Embodiments, the optical information recording medium 40 is provided with the management information area for storing the management information about a recording state of each information recording surface or each position on the information recording surface, the states of the whole or a part of the other information recording surfaces are decided based on the management information, and the laser power of the light source 1 is switched based on the decision result. Third Embodiment is characterized in that instead of using management information, the light receiving signals of the other information recording surfaces are detected, and the recording states of the other information recording surfaces are detected based on the light receiving signals.

Figure 8:
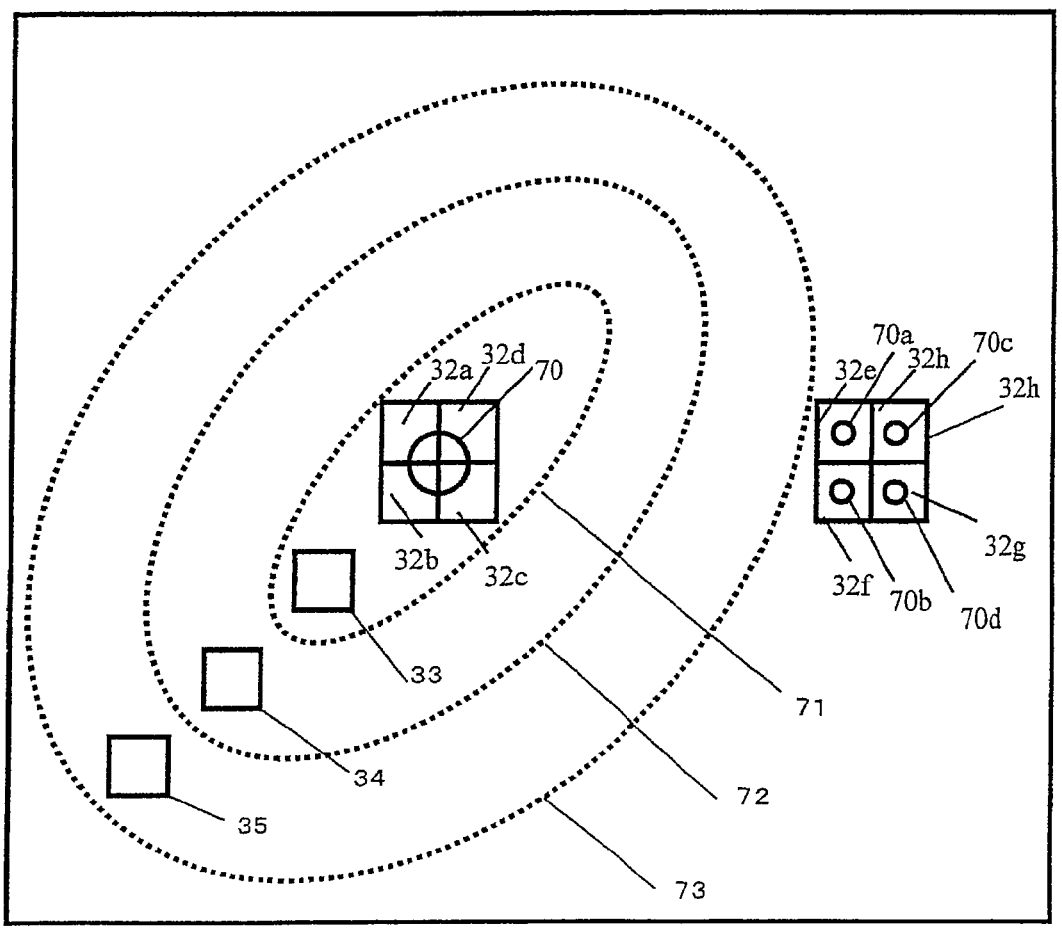
FIG. 8 is a view showing the configuration and operations of a photodetector making up an optical information apparatus according to Third Embodiment of the present invention.
Figure 9:
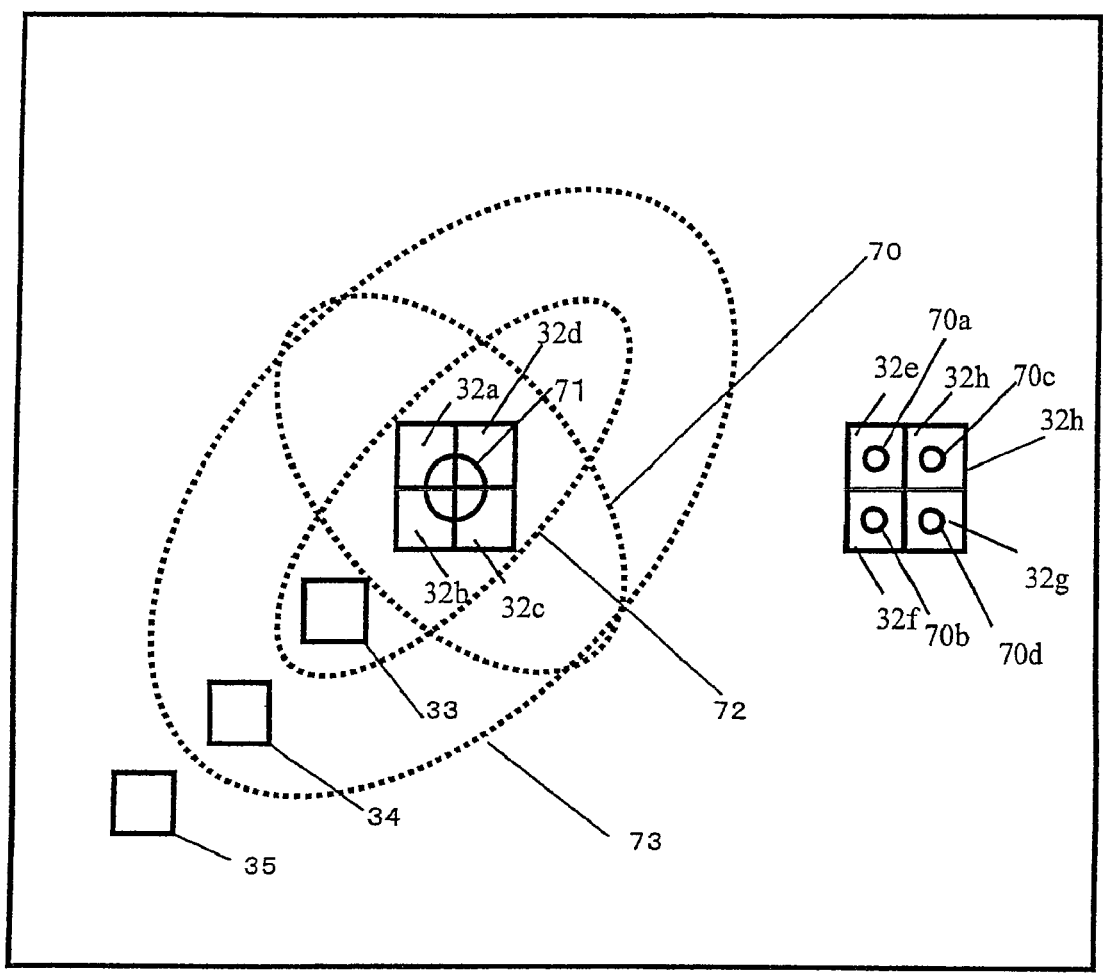
FIG. 9 is a view showing the configuration and operations of the photodetector making up the optical information apparatus according to Third Embodiment of the present invention.
Figure 10:
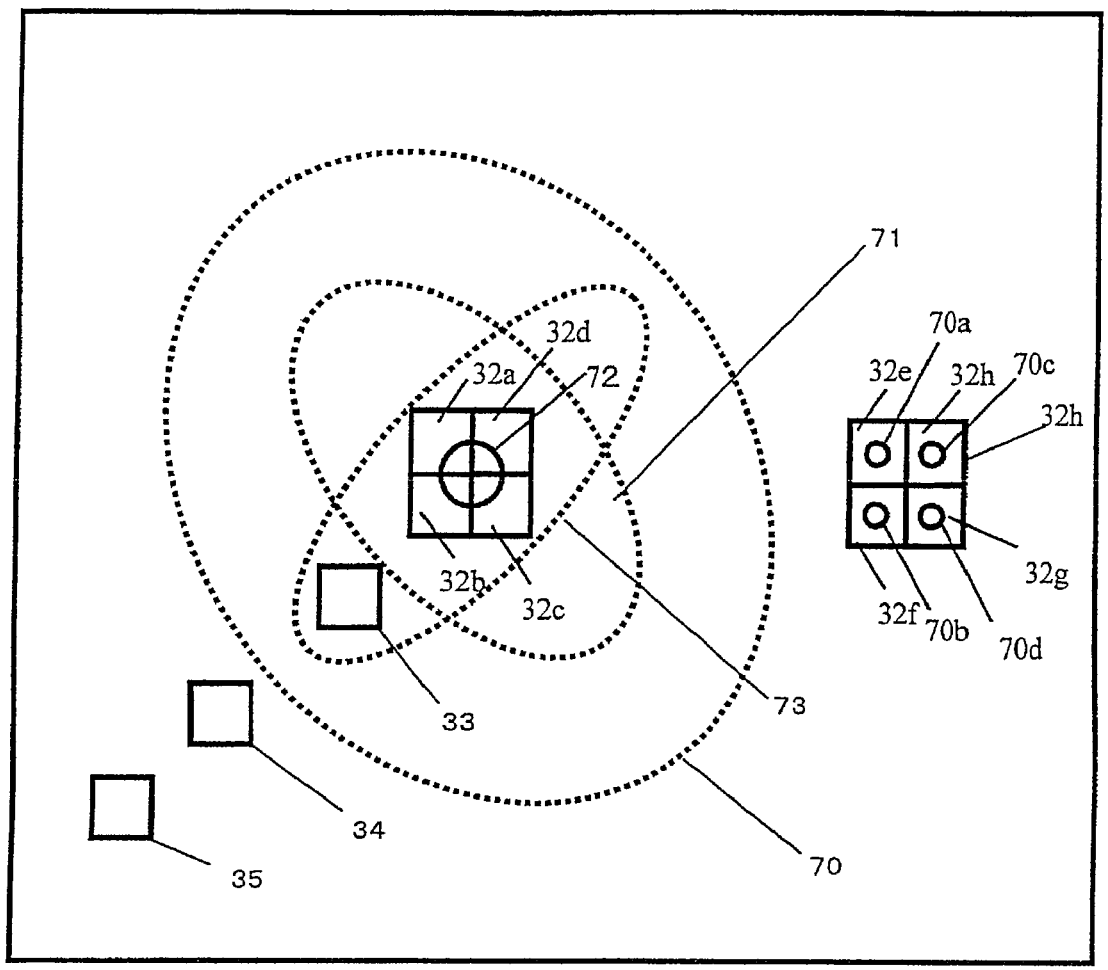
FIG. 10 is a view showing the configuration and operations of the photodetector making up the optical information apparatus according to Third Embodiment of the present invention.

FIGS. 8 to 10 are explanatory drawings of the configuration and operations of a photodetector 32 according to Third Embodiment.

An optical information apparatus of the present embodiment has almost the same configuration as First Embodiment but the photodetector 32 further comprises light receiving parts 33 to 35 for receiving light from a plurality of information recording surfaces other than an information recording surface on which information is currently recorded or reproduced in an optical information recording medium 40. A system controller 212 decides the recording states of the other information recording surfaces based on light received from the light receiving parts 33 to 35.

The light receiving parts 33 to 35 make up a second light receiving element of the present invention and respectively correspond to unit light receiving elements.

The following explanation refers to FIGS. 8 to 10.

(1) First, referring to FIG. 8, the following will describe a method of detecting the recording states of information recording surfaces 40b to 40d close to an object lens 56 when information is recorded or reproduced on an information recording surface 40a.

FIG. 8 shows a state in which a pencil of rays 71 reflected from the information recording surface 40b, a pencil of rays 72 reflected from the information recording surface 40c, and a pencil of rays 73 reflected from the information recording surface 40d are incident on the photodetector 32 when information is reproduced or recorded on the information recording surface 40a.

As shown in FIG. 8, the light receiving parts 33 to 35 are disposed in the major axis directions of the ellipses of the pencils of rays from the information recording surfaces 40b to 40d, with respect to light receiving parts 32a to 32d. The light receiving part 33 is disposed inside the pencil of rays 71, the light receiving part 34 is disposed outside the pencil of rays 71 and inside the pencil of rays 72, and the light receiving part 35 is disposed outside the pencil of rays 72 and inside the pencil of rays 73.

The following will explain an example of a method of judging whether or not information has been recorded on the information recording surfaces.

For example, in the case of the optical information recording medium 40 having the evenly spaced information recording surfaces 40a to 40d, when the information recording surfaces have equal reflectivities, the ratio of the luminous flux densities of the pencils of rays 71, 72 and 73 is 36:9:4.

In this case, when each of the information recording surfaces has a recording film on which the amount of light changes by 20% according to the recording state, a change in the luminous flux densities of the pencils of rays 71, 72 and 73 according to the recording state is based on the ratio of the luminous flux densities and the rate of change of the following equation:

$$(36 \times 0.2):(9 \times 0.2):(4 \times 0.2)=7.2:1.8:0.8$$

On the other hand, the light receiving part 35 only receives light reflected from the information recording surface 40d, the light receiving part 34 receives overlapping light reflected from the information recording surface 40d and the information recording surface 40c, and the light receiving part 33 receives overlapping light reflected from the information recording surface 40b, the information recording surface 40d, and the information recording surface 40c. Thus the ratio of the luminous flux densities of received light on the light receiving parts 33, 34 and 35 is $(36+9+4):(9+4):(4)=49:13:4$ Therefore, when information is recorded on one of the information recording surfaces 40b to 40d of the optical information recording medium 40, the amount of light changes as below based on the relationship with the light receiving parts corresponding to the information recording surfaces: (7.2/49) =about 15% is obtained for the light receiving part 33 for receiving the pencil of rays 71, (1.8/13)=about 14% is obtained for the light receiving part 34 for receiving the pencil of rays 72, and (0.8/4)=20% is obtained for the light receiving part 35 for receiving the pencil of rays 73.

In this case, in order to detect the recording state of the information recording surface 40d, the amount of light of the light receiving part 35 is detected. As is evident from FIG. 8, the light receiving part 35 only receives the pencil of rays 73, that is, light reflected from the information recording surface 40d. Thus it is understood that when the amount of light received on the light receiving part 35 changes by 20% or more, information has been recorded on the information recording surface 40d.

Next, in order to detect the recording state of the information recording surface 40c, the amount of light of the light receiving part 34 is detected. The light receiving part 34 receives overlapping light of light (pencil of rays 73) reflected from the information recording surface 40d and light (pencil of rays 72) reflected from the information recording surface 40c. In the overlapping light, the contribution of light reflected from the information recording surface 40c is obtained as a change of about 14% in the amount of light according to the above calculation. On the other hand, the contribution of light reflected from the information recording surface 40d to the light receiving part 34 is 14%×(4/9)=about 6.2%, which is smaller than the contribution of light reflected from the information recording surface 40c.

Therefore, it is understood that when the amount of light received on the light receiving part 34 changes by 14% or more, information is recorded at least on the information recording surface 40c.

Next, in order to detect the recording state of the information recording surface 40b, the amount of light of the light receiving part 33 is detected. The light receiving part 33 receives overlapping light of light (pencil of rays 71) reflected from the information recording surface 40b, light (pencil of rays 72) reflected from the information recording surface 40c, and light (pencil of rays 73) reflected from the information recording surface 40d. In the overlapping light, the contribution of the light reflected from the information recording surface 40b is obtained as a change of about 15% in the amount of light according to the above calculation. On the other hand, the contribution of light reflected from the information recording surfaces 40d and 40c to the light receiving part 33 is 15%×(4+9/36)=about 5.3%, which is smaller than the contribution of light reflected from the information recording surface 40b.

Therefore, it is understood that when the amount of light received on the light receiving part 34 changes by 15% or more, information is recorded at least on the information recording surface 40b.

In this way, the recording states of the information recording surfaces 40b to 40d can be separately decided based on the amounts of light received on the light receiving parts 33 to 35.

Further, the recording states of the information recording surfaces 40b to 40d can be separately decided also by detecting only a change in the amount of light of the light receiving part 33.

As described above, the light receiving part 33 is disposed on a position where the light spots of the pencils of rays 71, 72 and 73 which are reflected light from the information recording surfaces 40b to 40d overlap one another. Thus a detected change in the amount of light varies depending upon the recording states of the information recording surfaces 40b to 40d.

(Table 1) shows the correspondence between variations in the change rate of the amount of light and the combinations of the recording states of the information recording surfaces 40b to 40d.

TABLE 1

| Recording states of the information recording surfaces | | | Change rate of the amount |
|---|---|---|---|
| 40b | 40c | 40d | of light |
| Recorded | Recorded | Recorded | 20% |
| Recorded | Recorded | Unrecorded | 18% |
| Recorded | Unrecorded | Unrecorded | 15% |
| Unrecorded | Recorded | Recorded | 5% |
| Unrecorded | Recorded | Unrecorded | 4% |
| Unrecorded | Unrecorded | Recorded | 2% |

In this way, a change rate of the amount of light is uniquely determined according to the combination of the recording states of the information recording surfaces. Therefore, the system controller 212 stores (Table 1) as a table, so that when the light receiving part 33 is capable of detecting changes in the amount of light shown in Table 1, it is possible to separately decide the recording states of the plurality of information recording surfaces only based on a detection result of the light receiving part 33.

(2) Next, referring to FIG. 9, the following will describe a method of detecting the recording states of the information recording surfaces 40c and 40d close to the object lens 56 when information is reproduced on the information recording surface 40b.

FIG. 9 shows a state in which the pencil of rays 70 reflected from the information recording surface 40a, the pencil of rays 72 reflected from the information recording surface 40c, and the pencil of rays 73 reflected from the information recording surface 40d are incident on the photodetector 32 when information is reproduced or recorded on the information recording surface 40b.

The optical information apparatus of the present embodiment is provided with a cylindrical lens 57 to detect a focus error signal by astigmatism. Thus as shown in FIG. 9, the pencil of rays 70 formed of light reflected from the information recording surface 40a and the pencil of rays 72 formed of light reflected from the information recording surface 40c are incident on the photodetector 32 so as to form oval light spots intersecting each other.

In this case, the light receiving part 33 is disposed outside the pencil of rays 70 and inside the pencil of rays 72, so that the light receiving parts 33 and 34 are not affected by the pencil of rays 70 from the information recording surface 40a. In other words, the light receiving parts are disposed on positions other than an overlap of the light spot of the pencil of rays from the information recording surface closer to the object lens than the information recording surface on which information is to be recorded or reproduced and the light spot of the pencil of rays from the information recording surface farther from the object lens than the information recording surface on which information is to be recorded or reproduced. Thus it is possible to prevent the two light spots from overlapping each other on the positions of the light receiving parts 33 and 34.

The reason is as follows. As in the present embodiment, when the information recording surfaces are disposed both on the side close to the object lens 56 and the opposite side at equal distances with respect the information recording surface on which information is to be recorded or reproduced, light spots formed by light reflected from these information recording surfaces have substantially the same ratio of luminous flux densities. Thus when an amount of light is detected on a position where the light spots overlap each other, it is difficult to identify the light spots by using a change rate of the amount of light.

Thus in the present embodiment, an optical element is disposed, on a part other than an overlap of the light spot of a pencil of rays of light reflected from the information recording surface closer to the object lens than the target information recording surface and the light spot of a pencil of rays of light reflected from the information recording surface farther from the object lens than the target information recording surface with the operation of the cylindrical lens 57, and on a part where the light spot of a pencil of rays from the information recording surface is formed which requires the direct detection of an amount of light and is disposed on closer to the side of the object lens. Thus it is possible to eliminate the influence of light (the pencil of rays 70 in FIG. 9) reflected from the information recording surface adjacent behind, when viewed from the object lens, the information recording surface on which information is to be recorded or reproduced.

The ratio of the luminous flux densities of the pencil of rays 72 and the pencil of rays 73 is 4:1 in FIG. 9. Thus when each of the information recording surfaces has a recording film on which the amount of light changes by 20% according to the recording state, the luminous flux densities of the pencils of rays 72 and 73 change by (4×0.2):(1×0.2)=0.8:0.2.

Further, the ratio of the luminous flux densities of light received on the light receiving parts 33 and 34 is (4+1):1=5:1.

In order to decide the recording state of the information recording surface 40*d* closer to the object lens 56 than the information recording surface 40*b* by the two surfaces, the amount of light of the light receiving part 34 is detected. The amount of light of the pencil of rays 73 formed by light reflected from the information recording surface 40*d* changes by 20% depending upon whether information has been recorded or not, and light reflected from the other information recording surfaces is not received. Thus the recording state of the information recording surface 40*d* can be decided by detecting 20% of signals received by the light receiving part 35.

Next, in order to detect the recording state of the information recording surface 40*c*, the amount of light of the light receiving part 33 is detected. The light receiving part 34 receives overlapping light of the pencil of rays 73 of light reflected from the information recording surface 40*c* and the pencil of rays 74 of light reflected from the information recording surface 40*d*. When information is recorded on the information recording surface 40*c*, the amount of light on the light receiving part 33 changes by (0.8/5)=about 16%. On the other hand, the contribution of the information recording surface 40*d* is 16%×(1/5)=about 3.2%, which is smaller than that of the information recording surface 40*c*.

Therefore, it is understood that when the amount of light received on the light receiving part 33 changes by 16% or more, information has been recorded at least on the information recording surface 40*c*.

In this way, the recording states of the information recording surfaces 40*c* and 40*d* can be separately decided based on the amounts of light received on the light receiving parts 33 and 34.

Further, the recording states of the information recording surfaces 40*b* to 40*d* can be separately decided also by detecting only a change in the amount of light received on the light receiving part 33. In other words, as in the case where information is recorded/reproduced on the information recording surface 40*a*, the light receiving part 33 is disposed on a position where the light spots of the pencils of rays 72 and 73 which are reflected light from the information recording surfaces 40*c* and 40*d* overlap each other. Thus a detected change in the amount of light varies depending upon the recording states of the information recording surfaces 40*c* and 40*d*.

To be specific, relative to the amount of light of the light receiving part 33 when information has not been recorded on the information recording surfaces 40*c* and 40*d* as a standard, the change rate of the amount of light is 20% when information is recorded on the information recording surfaces 40*c* and 40*d*, the change rate of the amount of light is 16% when information is recorded on the information recording surface 40*c* and information is not recorded on the information recording surface 40*d*, and the change rate of the amount of light is 4% when information is not recorded on the information recording surface 40*c* and information is recorded on the information recording surface 40*d*.

The correspondence between variations in the change rate of the amount of light and the combinations of the recording states of the information recording surfaces 40*c* and 40*d* is stored as a table as in (Table 1), so that when the light receiving part 33 is capable of detecting a change in the amount of light, the system controller 212 can separately decide the recording states of the information recording surfaces 40*c* and 40*d* only based on a detection result of the light receiving part 33.

(3) Next, referring to FIG. 10, the following will describe a method of detecting the recording state of the information recording surface 40*d* close to the object lens 56 when information is reproduced on the information recording surface 40*c*. FIG. 10 shows a state in which the pencil of rays 70 reflected from the information recording surface 40*a*, the pencil of rays 71 reflected from the information recording surface 40*b*, and the pencil of rays 73 reflected from the information recording surface 40*d* are incident on the photodetector 32 when information is recorded or reproduced on the information recording surface 40*c*.

For the same reason as (2), with the operation of the cylindrical lens 57, the light spot of the pencil of rays 70 from the information recording surface 40*a* farther from the object lens 56 than the information recording surface 40*c* and the light spot of the pencil of rays 71 from the information recording surface 40*b* intersect the light spot of the pencil of rays 72 from the information recording surface 40*d*.

Since the light receiving part 33 is disposed outside the pencil of rays 71 and inside the pencil of rays 73, the light receiving part 33 is not affected by the information recording surface 40*b* disposed behind the information recording surface 40*c* on which information is reproduced. When the pencil of rays 70 reflected on the information recording surface 40*a* is incident on the light receiving parts 33, the ratio of the luminous flux densities of the pencil of rays 73 and the pencil of rays 70 is 4:1. As in (2), when the amount of light on the light receiving part 33 changes by 16% or more, it can be decided that information has been recorded at least on the information recording surface 40*d*.

(4) The emission power of the light source 1 is controlled as in First Embodiment after the recording states of the information recording surfaces are decided.

As described above, according to the present embodiment, the photodetector 32 has the light receiving parts 33 to 35 for receiving the pencils of rays reflected from the information recording surfaces other than the information recording surface on which information is to be recorded or reproduced, and changes in the amounts of light of the information recording surfaces are detected, so that it is possible to decide the recording states of the information recording surfaces disposed closer to the object lens 56 than the target information recording surface. By controlling the emission power of the light source 1 based on the decision result, information can be reliably recorded or reproduced.

In the above explanation, the information recording surfaces 40*a* to 40*d* of the optical information recording medium 40 are evenly spaced in the thickness direction of the medium. The information recording surfaces may be spaced at given intervals. Particularly when the information recording surfaces are spaced at given intervals, a ratio of luminous flux densities increases between light reflected from the information recording surface adjacent to, on the side close to the object lens, the information recording surface on which information is to be recorded or reproduced and light reflected from the information recording surface adjacent behind, when viewed from the object lens, the information recording surface on which information is to be recorded or reproduced. Thus the reflected light can be easily identified, so that the information recording surfaces can be further easily identified using a ratio of luminous flux densities.

The information recording surfaces of four layers are provided in the present embodiment. It is needless to say that the same effect can be obtained in a multilayer information recording medium having a plurality of information recording surfaces. In this case, the same effect can be obtained as long as the number of light receiving parts serving as the unit light receiving elements of the present invention is (h−1 (h: the number of the information recording surfaces)).

Moreover, as described in (1), (2) and so on, only the light receiving part 33 closest to the first detection part may be used by storing, as a table in the system controller 212, the correspondence between the combinations of the recording states of the information recording surfaces 40a to 40d of the optical information recording medium 40 and the change rates of the amounts of light corresponding to the combinations.

Further, in the foregoing embodiments, for each of the information recording surfaces 40a to 40c of the optical information recording medium 40, the recording states of the information recording surfaces closer to the object lens 56 than the target recording surface are detected and the light source 1 is controlled based on the detected recording states. The light source 1 may be controlled only based on recording and reproduction on the information recording surface 40a which is disposed on the innermost side when viewed from the object lens 56.

Figure 11:
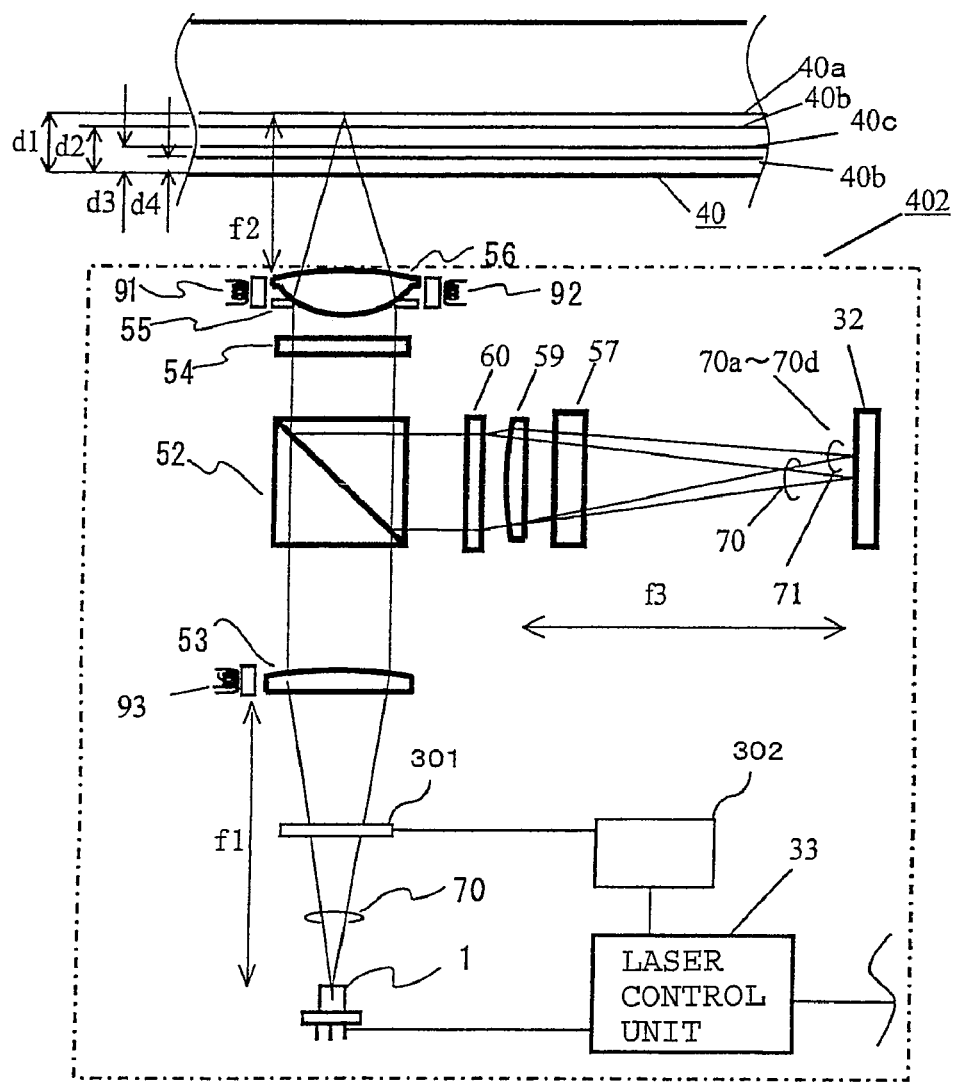
FIG. 11 is a view showing another structural example of the optical information apparatus according to the embodiments of the present invention.
Figure 12:
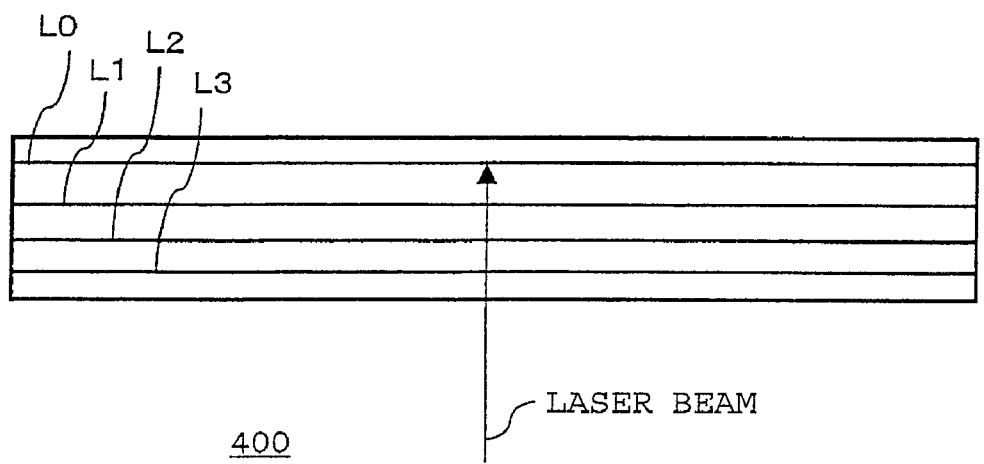
FIG. 12 is an explanatory drawing showing a problem of the conventional art.

Further, in the foregoing embodiments, the amount of light incident on the optical information recording medium 40 is controlled by controlling the magnitude of the emission power of the light source 1 by means of the laser control unit 133. As shown in a structural example of FIG. 11, a liquid crystal device 301 may be provided on the pencil of rays 70 from the light source 1 and a voltage generation part 302 for applying a predetermined control voltage to the liquid crystal device 301 based on a control signal from the laser control unit 133 may be provided. In this case, regarding the pencil of rays 70 from the light source 1, the amount of light incident on the optical information recording medium is adjusted while the emission power of the light source 1 is fixed. Thus it is possible to achieve an advantage that when the amount of laser light is stabilized after being changed or when the amount of light incident on the optical information recording medium 40 is suppressed, the output of the light source 1 is prevented from decreasing to a degree that quantum noise is larger than a permissible value.

The optical information recording medium 40 may be a WORM recording medium or a rewritable recording medium.

Further, in the above explanation, the recording states of the information recording surfaces are decided by the system controller 212 of the optical information apparatus based on management information from the optical information recording medium 40 or the received amount of reflected light. The decision may be directly controlled by the laser control unit 133. In this case, the optical controller of the present invention is realized as the optical head shown in FIG. 2.

Moreover, a program of the present invention causes a computer to perform the functions of all or some of the instruments of the optical controller of the present invention. The program may be run in coordination with the computer.

Further, the present invention is a medium for storing a program for causing a computer to perform all or some of the functions of all or some of the instruments of the optical controller according to the present invention. The medium may be a computer readable medium and the read program may perform the functions in coordination with the computer.

In the present invention, "some of the instruments" indicates some of a plurality of instruments or some functions of one instrument.

Further, a computer-readable recording medium for recording the program of the present invention is also included in the present invention.

Moreover, as a usage pattern of the program of the present invention, the program may be recorded on a computer-readable recording medium and run in coordination with a computer.

Moreover, as a usage pattern of the program of the present invention, the program may be transmitted through a transmission medium, read by a computer, and run in coordination with the computer.

Further, the recording medium includes a ROM.

The computer of the present invention is not simply limited to hardware such as a CPU and may include firmware, an OS, and peripheral equipment.

As described above, the configuration of the present invention may be realized as either software or hardware.

INDUSTRIAL APPLICABILITY

According to an optical controller, an optical information recording/reproducing apparatus, an optical information recording medium, and a method of controlling an optical head according to the present invention, when information is recorded or reproduced on the optical information recording medium having a multilayer structure, the information can be reliably recorded or reproduced regardless of the recording state of an information recording surface disposed at the front of an information recording surface on which the information is to be recorded or reproduced. The present invention is useful as an optical controller, a control method, and so on in an optical information recording/reproducing apparatus for recording or reproducing information on an information storage medium such as an optical disk and an optical card, for example, the present invention is useful as a recording/reproducing apparatus and the like for an image and music. The present invention is also applicable to storage of data and programs of a computer, storage of map data for car navigation, and so on.

The invention claimed is:

1. An optical controller, comprising:
a light source for emitting light;
an object lens for condensing light emitted from the light source onto a predetermined information recording surface of an optical information recording medium having a plurality of information recording surfaces;
a light detection unit for receiving the light reflected on the optical information recording medium and outputting a signal corresponding to an amount of the light; and
a control unit for controlling an amount of the light emitted from the light source to the information recording surface on which information is to be recorded or reproduced, based on a recording state of the information recording surface disposed closer to the object lens than the information recording surface on which the information is to be recorded or reproduced,
wherein the light detection unit has:
a first light receiving element for receiving the light reflected on the information recording surface on which information is to be recorded or reproduced; and
a second light receiving element for receiving the light reflected on the other information recording surfaces,
further comprising a cylindrical lens provided on an optical axis of the light detection unit, the cylindrical lens forming, as a plurality of light spots formed by light reflected from the information recording surfaces other than the information recording surface on which information is to be recorded or reproduced, an oval first light spot formed by light reflected from the information recording surface disposed closer to the object lens than the information recording surface on which information is to be recorded or reproduced and an oval second light spot formed by light reflected from the information recording surface farther from the object lens than the information recording surface on which information is to be recorded or reproduced, the second light spot intersecting the first light spot, wherein the second light receiving element is made up of (h−1 (h: the number of the plurality of information recording surfaces)) unit light receiving elements, the unit light receiving elements are disposed on positions where a plurality of light receiving areas are formed by light reflected from the other information recording surfaces and where no boundaries of light receiving areas are straddled, in the second light receiving element, each of the light receiving elements is disposed on a part other than an overlap of the first light spot formed by light reflected from the information recording surface disposed closer to the object lens than the information recording surface on which information is to be recorded or reproduced and the second light spot formed by light reflected from the information recording surface farther from the object lens than the information recording surface on which information is to be recorded or reproduced, the light receiving element being provided on a part where the first light spot is formed, and the control unit performs the control using the signal based on light received by the unit light receiving elements.

2. The optical controller according to claim 1, wherein the optical information recording medium has a management information area for managing the recording states of the plurality of information recording surfaces as management information, and the control unit obtains the management information based on the signal obtained from the light detection unit and performs control using the management information.

3. The optical controller according to claim 2, wherein the management information indicates presence or absence of recorded information on all or a part of the plurality of information recording surfaces; and the control unit, when information is recorded on the information recording surfaces closer to the object lens than the information recording surface on which information is to be recorded or reproduced, performs control to increase the amount of light according to the number of information recording surfaces.

4. The optical controller according to claim 1, wherein the information recording medium has four information recording surfaces.

5. The optical controller according to claim 1, wherein the optical information recording medium is a WORM recording medium.

6. The optical controller according to claim 1, wherein the optical information recording medium is a rewritable recording medium.

7. The optical controller according to claim 1, further comprising an aberration correcting unit provided on an optical path between the light source and the object lens to correct an aberration caused by a thickness of a protective film of the optical information recording medium.

8. An optical information recording/reproducing apparatus, comprising:
    an optical head for emitting light to an optical information recording medium and receiving light reflected from the optical information recording medium;
    an optical head control unit for controlling an operation of the optical head;
    a rotation driving unit for rotating the optical information recording medium; and
    an information recording/reproducing unit for transmitting and receiving, to and from the optical head, information to be recorded or reproduced on the optical information recording medium,
    wherein the optical head has the light source, the object lens, and the light detection unit of the optical controller according to claim 1, and
    the optical head control unit has the control unit of the optical controller.

9. An optical information recording medium, comprising:
    a plurality of information recording surfaces on which information can be recorded or reproduced by the optical information recording/reproducing apparatus according to claim 8, and
    a management information area for managing, as the management information, the recording states of the plurality of information recording surfaces.

10. The optical information recording medium according to claim 9, wherein the optical information recording medium is a WORM recording medium.

11. The optical information recording medium according to claim 9, wherein the optical information recording medium is a rewritable recording medium.

* * * * *